United States Patent [19]

Miyasaka et al.

[11] Patent Number: 4,618,255

[45] Date of Patent: Oct. 21, 1986

[54] PROCESS CAMERA APPARATUS

[75] Inventors: Eiji Miyasaka; Iwao Hirose, both of Hikone; Koji Yamashita, Omihachiman; Kenji Kawai, Hikone; Eiji Kanada, Nagaokakyo, all of Japan

[73] Assignee: Dainippon Screen Mfg., Co., Ltd., Kyoto, Japan

[21] Appl. No.: 745,641

[22] Filed: Jun. 17, 1985

[30] Foreign Application Priority Data

Jun. 18, 1984 [JP] Japan ................................ 59-126209
Jun. 18, 1984 [JP] Japan ................................ 59-126210
Jun. 18, 1984 [JP] Japan ............................ 59-91415[U]

[51] Int. Cl.⁴ ............................................. G03B 27/72
[52] U.S. Cl. ......................................... 355/71; 355/28; 355/72
[58] Field of Search ................ 355/50, 27, 28, 71, 355/72, 85, 29

[56] References Cited

U.S. PATENT DOCUMENTS 3,335,636  8/1967  Atkinson ........................ 355/71 X

*Primary Examiner*—Richard A. Wintercorn
*Attorney, Agent, or Firm*—Cushman, Darby & Cushman

[57] ABSTRACT

A process camera apparatus for forming a halftone image and a line image on a photosensitive material such as a positive or negative film. The apparatus comprises a base; a transparent platen provided on the base; a light-shielding cover covering the upper side of the transparent platen such as to form a light-shielded region on the transparent platen; a screen device including a contact screen and a screen frame for supporting the contact screen, the screen device being withdrawably disposed on the portion of the transparent platen within the light-shielded region; a pair of rollers disposed adjacent one end of the base and adapted for conveying the photosensitive material into the light-shielded region; and a light-shielded condition maintaining device adapted to maintain the light-shielded condition in the light-shielded region when the screen device is being taken out from the light-shielded region. The apparatus may be provided with a guide plate for guiding the photosensitive material while the same is being fed onto the transparent platen by the pair of rollers.

10 Claims, 11 Drawing Figures

PROCESS CAMERA APPARATUS

BACKGROUND OF THE INVENTION

1. Field of the Invention

The present invention relates to a process camera apparatus which is cpable of conducting, as required, both the line photographing of images such as letters or characters and halftone photographing of picture and patterns on a photosensitive material. The invention is concerned also with a process camera apparatus which is provided with a guide means for smoothly transporting the photosensitive material onto the transparent platen of the image take-up section.

2. Description of the Prior Art

A process camera apparatus capable of performing both line photographing and halftone photographing in a bright room is shown, for example, in Japanese Patent Laid-Open No. 189622/1983. This process camera apparatus for bright room photography has a photographing section with a base table carrying a transparent platen having an image forming surface. The process camera apparatus further has a film feeding section provided on one end of the base table. The film feeding section accommodates a photosensitive material in the form of a rolled film and is capable of sliding on the table. The film feeding section is adapted to feed the film into a gap formed between the transparent platen and a light shielding cover on the platen. The space between the platen and the light shielding cover is evacuated by menas of a vacuum pump connected to an evacuating groove formed in the peripheral portion of the platen such as to hold the film in close contact with the film during the exposure. Then, the film is sent to a processing section where the latent image formed on the film is developed.

When conducting the halftone photographing in the known process camera apparatus of the type explained aove, it is necessary to make use of a contact screen which is beforehand fixed to one end of the platen by means of an adhesive tape or the like. On the other hand, the line exposure needs to be conducted without using the contact screen. Therefore, in order to conduct a line exposure before or after a halftone exposure on the same film, it is necessary to attach and detach the contact screen to and from the platen.

In this connection, it is to be noted that the conventional process camera apparatus described above encounters a difficulty in quickly attaching and detaching the contact screen in such a manner as to avoid the breakage of the light-shielded condition of the light-shielded region between the platen and the light-shielding cover and to avoid any offset of the film during the attaching and detaching of the contact screen.

Another problem encountered by the conventional process camera apparatus resides in that it requires a complicated mechanism for correctly mounting the film on the predetermined position on the platen.

SUMMARY OF THE INVENTION

Accordingly, an object of the invention is to provide a process camera apparatus which is improved such as to permit an easy removal of the contact screen from the light-shielded region on the tanparent platen without breaking the light-shielded condition of such a region.

Another object of the invention is to provide a process camera apparatus which is improved such as to permit an easy attaching of the contact screen to the transparent platen without breaking the light-shielded condition of the light-shielded region.

A further object of the invention is to provide a copying camera apparatus which is improved such as to avoid any offset of the photosensitive material during attaching and detaching of the contact screen to and from the transparent platen.

Still further object of the invention is to provide a process camera apparatus which can smoothly feed the photosensitive material to the designated position on the tansparent platen.

To this end, according to the invention, there is provided a process camera apparatus comprising: a base; a tansparent platen provided on the base; a light-shielding means covering the upper side of the transparent platen such as to form a light-shielded region on the transparent platen; a screen means including a contact screen and a supporting means for supporting the contact screen, the screen means being withdrawably disposed on the portion of the tansparent platen within the light-shielded region; a conveyor means disposed adjacent one end of the base and adapted for conveying the photosensitive material into the light-shielded region; and a light-shielded condition maintaiing means adapted to maintain the light-shielded condition in the light-shielded region when the screen means is being takken out from the light-shielded region.

According to another aspect of the invention, there is provided a process camera apparatus comprising: a base; a transparent platen provided on the base; a light-shielding means covering the upper side of the tansparent platen such as to form a light-shielded region on the transparent platen; a conveyor means disposed adjacent one end of the base and adapted for conveying the photosensitive material into the light-shielded region; and a guide plate extending obliquely upwardly from a position near the outlet of the conveyor means to a position above the base and the transparent platen, such as to guide the photosensitive material when the latter is being fed onto the transparent platen.

These and other objects, features and advantages of the invention will become clear from the following description of the preferred embodiment when the same is read in conjunction with the accompanying drawings.

DETAILED DESCRIPTION OF THE PREFERRED EMBODIMENTS

Figure 1:
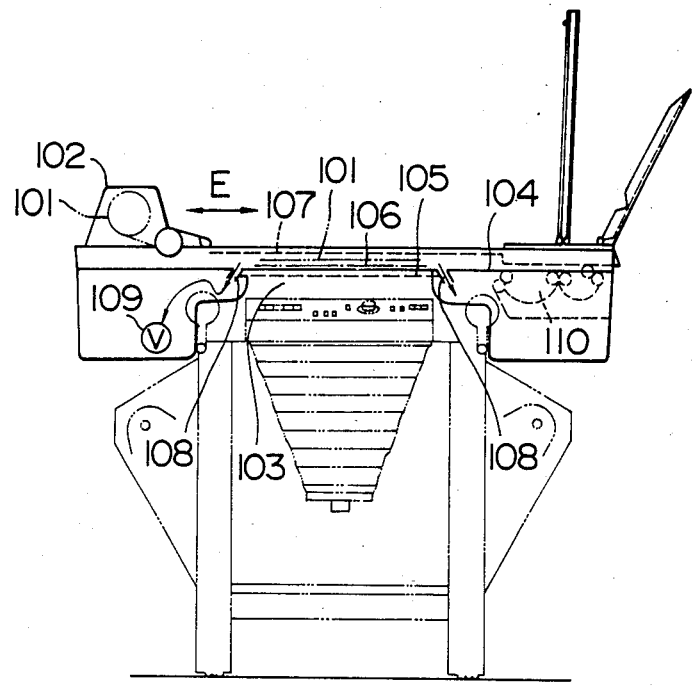
FIG. 1 is a schematic illustration of a conventional camera apparatus for daylight photographing.

FIG. 1 shows a conventional process camera apparatus for use in bright room, of the type shown in Japanese Patent Laid-Open No. 189622/1983 mentioned before. This camera apparatus has a photographing section 103 having a base table 104 on which is mounted a transparent platen 105 having an image-forming surface. A film feeding section 102, which accommodates a photosensitive material in the form of a roll film 101, is mounted on one end of the base table 104 for sliding movement in the direction of the arrow E. The film feeding section 102 is adapted to feed the film 101 into the space between the transparent platen 105 and a light-shielding cover sheet 107 which covers the platen 105. The platen 105 is provided in the periphery thereof with an evacuating groove 108 which is communicated with a vacuum pump 109 so that the space between the platen 105 and the light-shielding cover 107 is evacuated by means of the vacuum pump 109 such as to maintain the film 101 in close contact with the platen 105 during the exposure. The film 101 is then sent to a processing section 110 where the latent image formed on the film 101 is developed. It is thus possible to photograph an image in a daylight room.

This process camera apparatus is designed to be able to be used for a halftone exposure. when the process camera apparatus is used for this purpose, a contact screen 106 is beforehand fixed to one end of the platen 105 by means of an adhesive tape or the like fixing means.

In the practical use of a process camera apparatus, it is often required that, before or after the halftone exposure using the contact screen, a high-light exposure of the same image without the contact screen or an exposure of another image, e.g., a line exposure, has to be conducted, such as to effect an overlap exposure. For instance, when it is desired to conduct an overlapping exposure by effecting a line exposure for a line image such as characters or letters without using the contact screen and a halftone exposure of a picture image by the use of the contact screen before or after the line exposure. In such a case, it is strictly required that the halftone picture image and the line image correctly overlap each other. This in turn requires a troublesome work for effecting the line exposure before or after the halftone exposure by detaching or attaching the contact screen 106 without allowing any movement or offset of the film 101.

On the other hand, a color printing process requires the preparation of color-separated halftone plates of four colors, i.e., cyane, magneta, yellow and black. This requires the use of contact screens of different screen angles for different colors. These contact screens have to be easily mounted and demounted promptly and easily in a daylight room.

The known process camera apparatus disclosed in Japanese Patent Laid-Open No. 189622/1983 does not fully meet these requirements, and suffers from difficulties particularly in the overlaping exposure consisting in a halftone exposure and a line exposure, as well as in the preparation of 4-color separated plates.

A first embodiment of the invention, which will be explained later with reference to FIGS. 2 to 5, can overcome these problems of the prior art.

Another problem encountered by the known process camera apparatus shown in FIG. 1 is that the correct feeding and positioning of the film 101 on the platen 105 is often failed due a fact that in the film 101 which is fed along the upper surface of the plate 105 undesirably contacts the edge of the contact screen 106 and the wall of the evacuating groove 108 formed in the periphery of the platen 105.

In order to obviate this problem, the conventional process camera apparatus employs a specific arrangement for the film feeding section. Namely, in the conventional process camera apparatus, the film feeding section 102 accommodating the film 101 is fed in the direction of the arrow E beyond the edge of the contact screen 106 and the wall of the evacuating groove 108 and then the film 101 is fed and cut at a predetermined length such as to be laid and fixed directly on the platen 105 or the contact screen 106 placed on the platen 105. Then, the film feeding section 102 is returned to complete the film feeding cycle.

The film feeding section 102 accommodating the rolled film is considerably heavy. Thus, the operator is obliged to move this heavy film so as to feed and place the film onto the platen 105 at each time of the exposure. This undesirably burdens the operator and complicates the construction of the apparatus as a whole, resulting in a raised cost of production.

A second embodiment of the invention, which will be explained later in connection with FIGS. 6 and 7, can overcome this problem.

Figure 2:
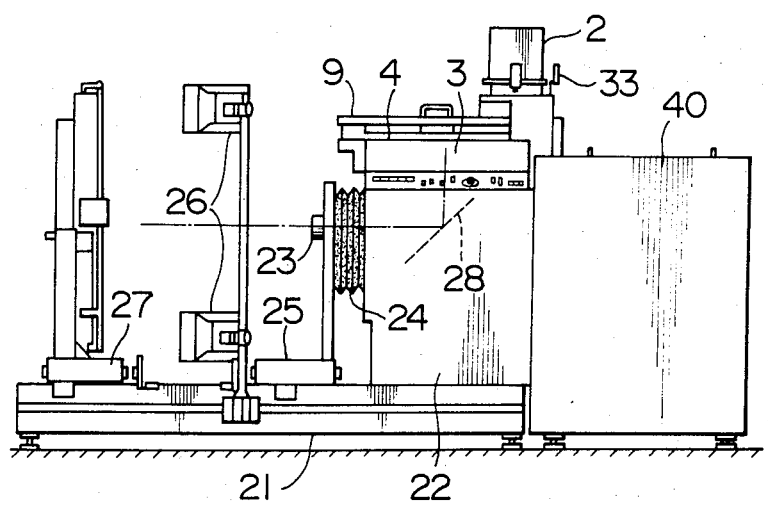
FIG. 2 is a side elevational view of the whole portion of a first embodiment of the process camera apparatus in accordance with the invention.

FIG. 2 is a side elevational view of the first embodiment of the process camera apparatus in accordance with this invention.

Referring to this Figure, a reference numeral 21 denotes a base frame on which is fixed a dark box 22. A lens carrier 25 connected to the dark box 22 through a bellows 24 is movably carried by the frame 21. The frame 21 movably carries also a light source device 26 and an original carrier 27. A mirror 28 is mounted in the drak box 22.

A photosensitive material such as a film, photographic printing paper, diffusion transfer paper, plate material for direct plate-making, plate material for offset printing or the like is fed from a cassette 2 to the photographing section 3 for an exposure to the image of the original on the original carrier 27. The photosensitive material is then fed to a procesing section 40 where the latent image is developed thus forming a plate.

Figure 3:
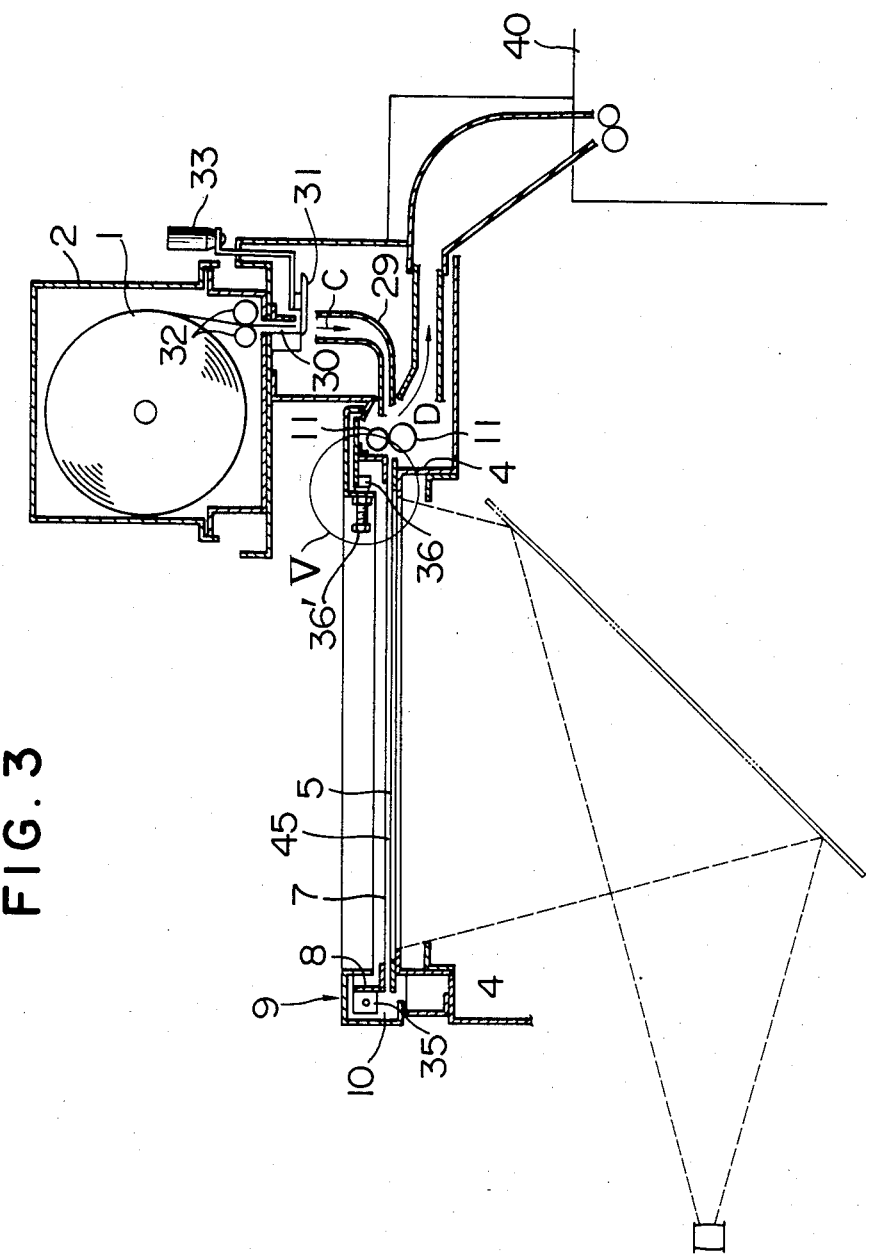
FIG. 3 is a sectional side elevational view of the first embodiment, showing in particular a portion around a photographing section thereof.
Figure 4:
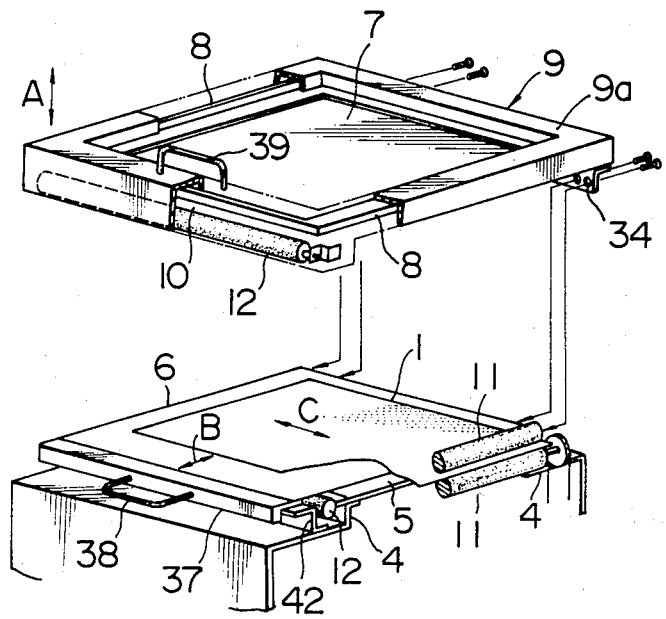
FIG. 4 is an exploded perspective view of the portion of the first embodiment shown in FIG. 3.
Figure 5:
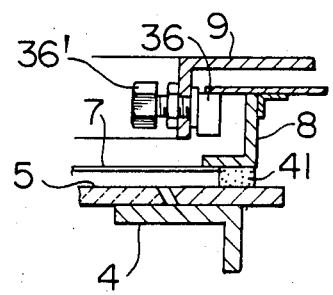
FIG. 5 shows, in a larger scale, a modification of a portion marked at V in FIG. 3.

FIGS. 3 and 4 show the detail of the photographing section 3 of the process camera apparatus shown in FIG. 2. The photographing section 3 includes a base plate 4 carrying a platen 5 including a transparent glass plate on the upper surface of which an image of the original is formed.

A pair of photosensitive material feeding and discharging rollers 11,11 provided on one side of the base 4 in combination consititute a conveyor means for pinching and conveying the photosensitive material 1 onto the platen 5 and to discharge the exposed photosensitive material carrying the latent image to the processing section 40.

The rollers 11,11 are connected through a guide 29 to the cassette 2 accommodating the rolled photosensitive material. A movable rotary cutter 31 disposed in the vicinity of the photosensitive material outlet 30 of the cassette 2 is adapted to be operated manually through a handle 33 such as to cut the photosesnsitive material 1 when the latter has been fed by a predetermined length by means of a feeding roller 32.

The feeding roller 32 and the feeding and discharging rollers 11,11 are drivingly connected to each other through a suitable means which is not shown and may be drivingly connected to the cutter 31 if necessary.

Referring now to FIG. 4, a light-shielding frame 9 having a substantially rectangular planar shape has a base frame 9a and a frame member 8. The base frame 9a is pivotally connected to the base 4 by means of a hinge 34. The base frame 9a has a substantially U-shaped cross-section the open end of which is directed downwardly, i.e., towards the base 4. As will be seen from FIG. 3, the frame member 8 which fits in the downward opening 10 of the base frame 9a has an L-shaped cross-section and is provided with a light shielding cover 7 stretched thereon. More specifically, one side of the frame member 8 is fixed in the corresponding opening 10 of the base frame 9a by means of a hinge 35, while the opposite side of the same is received by the corresponding opening 10 of the base frame for a free vertical movement through an adjusting means such as a cam 36. The arrangement is such that the end of the light-shielding cover 7 adjacent the end from which the photosensitive material 1 is fed is lifted as desired by the operation of the adjusting means such as the cam 36 which is turn is operated, for example, by a knob 36'. The light-shielding frame 9, light-shielding sheet 7 and other associated members in combination constitute a light-shielding means.

A roller 12 made of an elastic material, constituting the means for maintaining the light shield during the detaching of the contact screen 6, is provided on one side of the base 4 adjacent the side of the frame 9 carrying the feeding and discharging rollers 11,11, i.e., on the front side of the base 4. A roller 12 for cooperation with the above-mentioned elastic roller is rotatably disposed in the opening 10 of the base frame 9a.

The contact screen 6 is supported at its one side through an adhesive means by a supporting means, practically a screen frame 37 provided with a handle 38. For mounting the contact screen 6, the operator grips the handle 39 on the light-shielding frame 9 and swings the latter upwardly as indicated by an arrow A to an open position. Then, the screen frame 37 is placed on a platen 5 such that it is registered with a reference side 42 provided on the base 4. Meanwhile, the light-shielding frame 9 is urged and maintained in the open position by the action of a spring member (not shown) in the hinge 34.

The described first embodiment of the invention is used in a manner which will be explained hereinunder.

After opening the light-shielding frame 9, the contact screen 6 is inserted in the direction of an arrow B and is placed on the platen 5. More specifically, the contact screen is moved onto the platen 5 while being guided by the lower roller 12 provided on the base 4 and is placed such that the screen frame 37 is held in contact with the reference side 42.

Then, the light-shielding member 9 is moved to the closing position so that the contact screen 6 is clamped between the pair of rollers 12, 12 constituting the light-shield maintaining means, whereby a light-shielded region or space 45 is formed between the platen 5 and the light-shielding cover seat 7 on the platen 5. In order to improve the light-shielding effect, the L-shaped frame member 8 on which the light shielding cover 7 is stretched may be provided with a light-shielding member 41 in the form of a bank made of a sponge or the like material attached to the peripheral portion of the underside of the frame member 8, as will be seen from FIG. 5. Then, the end of the frame memer 8 adjacent the entrance for the photosensitive material 1 is lifted by the aforementioned adjusting means, thus allowing the photosensitive material 1 to be placed on the platen 5.

Subsequently, the feeding roller 32 on the cassette 2 is driven to feed the photosensitive material 1 by a predetermined length. Meanwhile, the feeding and discharging rollers 11,11 are driven because they are drivingly connected to the feeding roller 32. After feeding the photosensitive material 1 by a predetermined length, the feeding roller 32 and the feeding and discharging rollers 11,11 are stopped and the cutter 31 is operated to cut the photosensitive material in a predetermined length.

After the cutting of the photosensitive material, only the feeding and discharging rollers 11 are driven to feed the photosensitive material 1 onto the contact screen 6 which is placed on the platen 5. As will be seen from FIG. 4, when the feed of the photosensitive material 1 has been completed, the feeding and discharging rollers 11,11 firmly clamps the trailing marginal end of the photosensitive material 1. This trailing marginal end is out of the area for the formation of the image. Due to this firm clamping of the photosensitive material 1, the undesirable movement or offset of the photosensitive material during the attaching and detaching of the contact screen 6 can be avoided advantageously.

Then, the knob 36' of the adjusting means is operated such as to lower the light-shielding cover 7 stretched on the frame member 8, and the vacuum sucking means such as a vacuum pump (not shown) is driven threby evacuating the space between the platen 5 and the light-shielding cover 7, thus bringing the contact screen 6 on the platen 5 and the photosensitive material 1into close contact with each other.

In this state, the camera apparatus is ready for a halftone exposure for forming a halftone latent image on the photosensitive material 1 through the contact screen 6. Then, a line exposure for forming the line images such as letters or characters can be conducted in accordance with the following procedure.

After breaking the vacuum formed by the vacuum sucking means, the user grips the handle 38 and pulls the contact screen 6 out of the photographing section 3. In this state, the contact screen 6 is clamped between the pair of rollers 12, 12, so that the shielded condition in the photographing section 3 is never impaired during the extraction of the contact screen. In addition, the undesirable movement or offet of the photosensitive material 1 is prevented because the trailing marginal end of the photosensitive material 1 is firmly gripped by the pair of feeding and discharging rollers 11, 11.

Subsequently, the vacuum sucking device is operated again to bring the photosensitive material into close contact with the platen 5, thus allowing a line photographing.

Needless to say, during the halftone exposure for picture image, a suitable mask is used to cover the region of the original outside of the area carrying the picture image to be photographed. Similarly, a suitable mask is used to cover the region of the original other than the area carrying the line image to be photographed, during the line exposure. However, such a masking on the original is not necessary if the photographing section 3 is equipped with a masking device which can cover the unnecessary area on the photosensitive device.

The conveyor means for conveying the photosensitive material, which is constituted by a pair of feeding and discharging rollers 11,11 in the described embodiment, need not always have both the functions for feeding and discharging the photosensitive material, as in the case where the processing section 40 is disposed at the opposite end of the apparatus to the position of the processing section 40 illustrated in FIGS. 2 and 3.

The light-shield maintaining means, which is constituted by a pair of rollers 12,12 may be constituted by other suitable members such as brush-like light shielding means.

In the first embodiment described hereinbefore, the frame member on which the light-shield cover sheet 7 is stretched over is lifted up by means of the adjusting means during the feeding and setting of the photosensitive material onto the platen. The lifting up of the frame member, however, is not essential and such an arrangement is possible as adapted to allow the feed and placement of the photosensitive material onto the platen without lifting up the frame.

The photosensitive material 1, now carrying a composite latent image consisting of the halftone picture latent image formed by the halftone exposure and the line latent image formed by the line exposure is delivered by reversing of the feeding and dicharging rollers 11, 11 to the processing section 40, where the composite latent image is developed to become a visible image.

As will be understood from the foregoing description, according to the first embodiment of the invention, the exposure is conducted while the photosensitive material is being clamped at its trailing end by means of the pair of rollers which are adapted to feed and discharge the photosensitive material to and from the position on the platen. In addition, one of the rollers clamping the contact screen is mounted on the base while the other roller is attahced to the light-shielding frame which is swingable to an open position, so that the contact screen can be extracted while maintaining the light-shielded condition inside the photographing section.

This process camera apparatus, therefore, offers the following advantages:

(a) The attaching and detaching of the contact screen, which are necessary for conducting the line exposure after a halftone exposure or vice versa, can be conducted guide easily and simply.

(b) The process camera apparatus of the invention permits the formation of a picture image by a halftone exposure and line image by a line exposure on the same photosensitive material in a daylight room. The apparatus, therefore, can be used as an overlapping exposure apparatus. This is quite advantageous from the view point of working condition and health of the operators, considering that the most of overlapping exposure work has been conducted in dark rooms.

Figure 6:
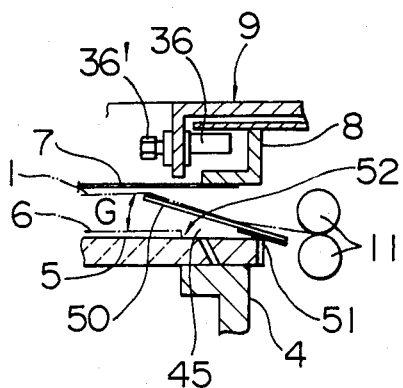
FIG. 6 is view similar to FIG. 5, showing an essential part of a second embodiment of the process camera apparatus in accordance with the invention.
Figure 7:
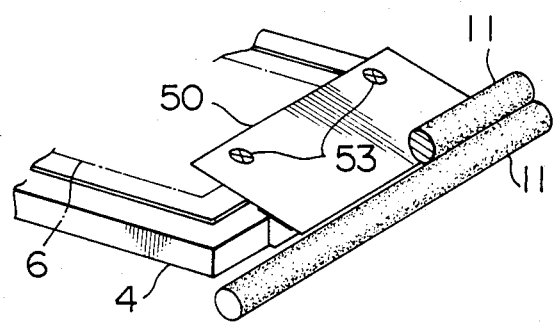
FIG. 7 is an enlarged perspective view of the essential part of the second embodiment shown in FIG. 6.

FIGS. 6 and 7 show a second embodiment of a process camera in accordance with the invention. The portions of the second embodiment, other than those specifically shown in FIGS. 6 and 7, are materially identical with the arrangement of the first embodiment described in connection with FIGS. 2 to 5. Therefore, the same reference numerals are used to denote the same parts or members throughout FIGS. 2 to 7.

In FIGS. 6 and 7, a reference numeral 50 designates a guide plate for guiding the photosensitive material 1 when the latter is moved onto the platen 5 by means of the feeding and discharging rollers 11, 11. The guide plate 50 is extended obliquely upwardly from the outlet of the feeding and discharging rollers 11, 11 as viewed in the feeding direction to a position above the base 4 and the platen 5. The guide plate 1 is pivotally secured to the end of the base 4 adjacent the feeding and discharging rollers 11, 11 through a spring-urged hinge 51, such as to be able to swing in the direction of arrow G (see FIG. 6). Preferably, the spring in the spring-urged hinge 51 has such a spring constant as to allow the guide plate 50 to be easily depressed by the guide plate 50 or the frame member 8 or the light-shielding cover sheet 7 when the frame member 8 is moved downwardly by means of the knob 36' after the setting of the photosensitive material 1 on the platen 5.

This manner of attaching of the guide plate 50 to the base 4 is only illustrative and the guide plate 50 and the attaching hinge portion may be constructed as a unit with each other from a resilient material such as of vinylchloride, resin film, thin metallic sheet or the like, such that the same effect as that produced by the illustrated arrangement may be obtained.

Anyway, it is preferred that the guide plate 50 is displaceable such that the underside of the guide plate 50 projecting into the light-shielded region approaches the base 4 or the platen 5, and this displacement may be made after the photosensitive material 1 has been moved into the light-shielded region 45. Such a displacement of the guide plate may be effected by a spring-urged hinge 51 through which the guide plate 50 is fixed to the base or, alternatively, by forming the guide plate from a material capable of making a resilient or elastic deformation.

The guide plate 50 may be constituted by a conductive material such as a thin metallic sheet, film having a metallic layer formed by evaporation process, or the like. In such a case, the guide plate 50 can be electrically grounded directly or through the base 4 to which the guide plate 50 is secured. With such an arrangement, it is possible to remove the electrostatic charge which are generated on the photosensitive material 1 as a result of friction with the feeding roller 32 (see FIG. 3) and the feeding and discharging rollers 11,11, thus smoothing the feed of the photosensitive material 1 onto the platen 5.

The operation of the second embodiment will be explained herinunder. Firstly, a contact screen 6 is placed on the platen 5 and is fixed to the same by an adhesive tape. Then, the knob 36' of the adjusting means is opertaed to rotate the cam 36, such as to lift up the end of the frame member 8 adjacent the entrance for the photosensitive material 1. Then, the light-shielding frame 9 is closed so that the space 45 between the platen 5 and the light-shielding cover sheet 7 is completely shielded from the ambient light.

Subsequently, the photosensitive material 1 is fed onto the contact screen 6 in the same manner as the firt embodiment.

It is to be noted that, in the second embodiment of the invnetion, the guide plate 50 ensures a smooth feed of the photosensitive material by avoiding undesirable contact between the leading end of the photosensitive material 1 with the edge 52 of the contact screen 6, even when the same is placed on the plate 5. When the supply of the photosensitive material 1 to the platen 5 has been finished, the feeding and discharging rollers 11, 11 firmly grips the trailing marginal end of the photosensitive material 1, as in the case of the first embodiment.

Then, as in the case of the first embodiment, the cam 36 is rotated to lower the light-shielding cover sheet 7 stretched over the frame member 8, and the vacuum sucking device (not shown) is started to evacuate the space 45 such as to bring the photosensitive material 1 on the platen 5, as well as the contact screen 6 placed as desired, into close contact with the platen 5. In this state, the guide plate 50 is pressed onto the platen 5 or the base 4 as is the photosensitive material 1.

An exposure is conducted in this state and, thereafter, the vacuum sucking device is switched to dismiss the close contact. Subsequently, the feeding and discharging rollers 11, 11 are reversed to discharge the photosensitive material to the processing section 40 where the latent image is developed into visual image.

In the described second embodiment of the invention, a process camera for daylight photographing incorporates a sheet guide means, i.e., the guide plate 50, which is designed for guiding the photosensitive material when the same is fed onto the platen. Obviously, however, the sheet guide means can be applied also to process cameras which are designed for photographing only in dark rooms. It will be obvious also that the sheet guide means used in the described embodiment can be applied equally to various uses such as feed of a photosensitive material or an original sheet in a printing apparatus such as close-contact type printers, feed of original sheet in an electronic photographic machine and other various uses which require a feeding and setting of a sheet material to and on a predeterminend position.

The described second embodiment of the process camera in accordance with the invention employs a guide plate which is pivotally secured at its base end portion to one end of the base, the guide plate being adapted to guide the photosensitive material which is fed by the feeding and discharging roller onto the platen against the weight of the photosensitive material. By virture of this feature, the described second embodiment offers the following advantages:

(a) The photosensitive material is fed smoothly onto the platen because the guide plate prevents the leading end of the photosensitive material from abutting the wall of the peripheral evacuating groove in the platen and the end edge of the contact screen which is placed as required on the platen. In addition, the guide plate reduces the length of contact between the photosensitive material and the platen, thus allowing a precise positioning of the photosensitive material on the platen, thereby eliminating troubles which may otherwise be caused during the feed of the photosensitive material.

(b) The process camera apparatus of this embodiment is easy to operate as compared with the conventional apparatus which requries the operator to manually move the heavy film feeding means at each time of the photograping. In addition, construction of the apparatus as a whole is simplified as compared with the conventional apparatus.

The second embodiment of the invention described hereinbefore is designed such as to permit printing of register marks on the photosensitive material such as a film, plate material for direct plate-making process and so forth, simultaneously with the photographing of the original image on such a photosensitive material.

An explanation will be made hereinunder as to the case where the process camera of the second embodiment is used as a camera generally referred to as "direct plate camera" which makes use of a plate material for direct plate making process as the photosensitive material.

Figure 8:
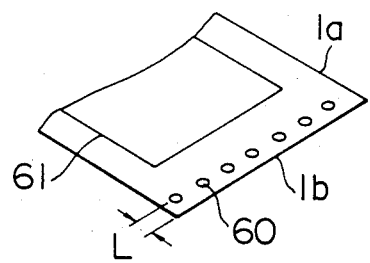
FIG. 8 is an illustration of a process in which a plate, which has been formed by subjecting a photosensitive material to exposure and development, is set on a plate cylinder.

Using a plate material for the direct plate making process as the photosensitive material, it is possible to obtain a plate for printing through an exposure and development conducted by a process camera of the type shown in FIG. 1. FIG. 8 shows an example of the manner in which a plate thus prepared is set on a plate cylinder of a press. A row of holes 60 are formed by punching along one side 1b of the plate 1a by making use of the side 1b as the reference. After the end of the plate 1a having the holes 60 is fixed to a gripper of the plate cylinder, the plate 1a is wound round the plate cylinder and the other end of the plate 1a is fixed to the plate cylinder. The printing system including the combination of a direct plate camera and a press has been well known and widely used as a smallscale printing system.

This small-scale printing system has been used mainly for monocolor printing. However, current improvement in the performance of the printing photosensitive material has given a rise to the demand for color printing using this simple small-scale printing system.

Generally, the color printing process employs overlapping printing with at least two colors using different separated color films and, therefore, tends to suffer from offset of color during the overlapping printing. In order to avoid this problem, it has been a common practice to form registers mark on the separated color films simultaneously with the preparation of such films or, alternatively, before or after the preparation of such films. In ths printing, the position of the films and, hence, the positions of the images on the films are correctly aligned by making use of the register marks in the films as a reference. Unfortunately, however, there has been no direct plate camera for small-scale printing which is capable of forming the register marks simultaneously with the exposure.

Hitherto, therefore, the formation of the register mark has been made by a method in which the original is adhered to or fitted on a base sheet which is provided with register marks printed in its peripheral region and then subjecting the photosensitive material to an exposure to the original image and the register marks printed on the base sheet.

This conventional method, however, involves various problems. For instance, when the exposure is made at different magnifications, the distance or relative position between the image and the register marks is chagned at each time of change of the magnification. Therefore, it is often experienced that the register marks are formed out of the area of the photosensitive material, particularly when the size of the photosensitive material is small, or, alternatively, the register marks are formed in the area where such register marks should not be formed. In addition, when the photographing magnification is increased, the thickness of the lines constituting the register mark is increased to exceed the maximum thickness allowable for the registering which is usually 0.05 m/m. In such a case, the register marks can no more function as the means of registering.

On the other hand, the monocolor printing suffers from the following problem, although it does not necessitate registering work for the prevention of offset of colors. Namely, if the edge 1b of the plate 1a constituting the reference for the punch holes 60 is cut in a somewhat wrong positional relationship to the image 61, the rows of the punched holes 60 also is formed in a wrong positional relationship to the image. Consequently, the position of the image is deviated from the right position when the plate is attached to the plate cylinder by making use of the rows of the punched holes as the reference.

These poblems are overcome by the second embodiment, as will be understood from the following description.

As will be seen from FIG. 7, the guide plate 50 is provided with two positive register marks 53 such that the line connecting these two register marks 53 extend in parallel with a reference line presented by one side of the platen 5. This guide plate is constituted by a transparent material. Therefore, the images of the register marks 53 are printed on the photosensitive material, simultaneously with the exposure to the original image.

The cross-like shape of the register marks 53 in the illustrated embodiment is not exclusive and any known forms of register marks are usable. It is to be understood also that the register marks may be a negative register marks.

Figure 9:
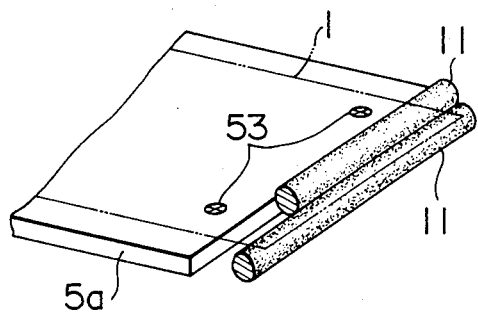
FIGS. 9 to 11 are perspective views illustrating various methods for recording register marks on a photosensitive material.
Figure 10:
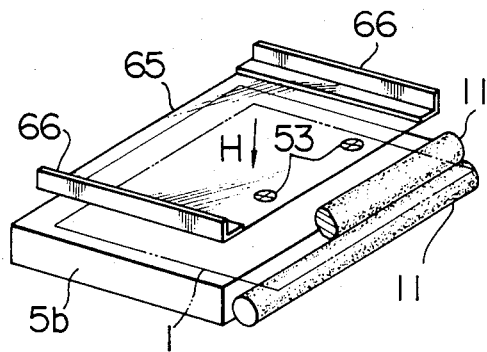
Figure 11:
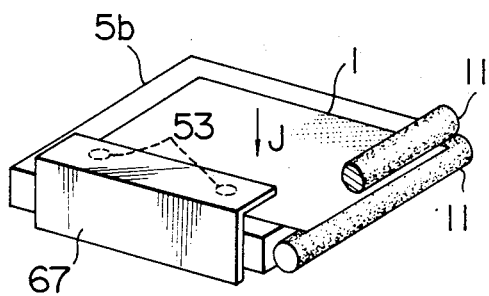

According to this arrangement, the register marks are formed always at predetermined positions on the photosensitive material, so that the aforementioned problems encountered, for example, in the preparation of separated color plates for color printing of a color image can be overcome advantageously FIGS. 9 to 11 show various methods for forming the register marks simultaneously with the exposure, conceived by the present inventors from the same technical point of view as that of the second embodiment.

In a method shown in FIG. 9, a pair of register marks 53 are formed on the upper surface of the platen 5a such that the line connecting the register marks extends in parallel with the side of the platen adjacent the entrance for the photosensitive material.

FIG. 10 shows a method which is usable when the exposure is made from the upper side as indicated by an arrow H. In this case, the platen 5b is constituted by a vacuum sucking plate having a multiplicity of suction holes. This method makes use of a frame member 66 on which is stretched a transparent sheet member 65 having register marks 53 on predetermined portions thereof. After the photosensitive material is set on the platen 5b, the frame member 66 is placed at a predetermined position in close contact with the photosensitiv material 1, and the exposure is conducted by applying light from the upper side, whereby the images of the register marks are formed on predetermined portions of the photosensitive material 1.

A method shown in FIG. 11 employs a platen 5b constiuted by a vacuum sucking plate having multiplicity of suction holes, similar to the platen 5b used in the method shown in FIG. 10. After the photosensitive material 1 is set on the platen 5b, and L-shaped member 67 is superposed to the photosensitive material 1 in close contact therewith, such that an L-shaped member 67 is held in contact with one side of the platen 5b constituting a reference. The exposure is made by applying the light from the upper side as indicated by an arrow J, so that the register marks 53 provided on the lower side of the L-shaped member are printed on predetermined portions of the photosensitive material 1.

The methods explained in conjunction with FIGS. 10 and 11 are suited to vertical process cameras in which the exposure is made by light applied from the upper side as indicated by arrows H and J. These methods, however, are applicable also to the process camera of the type shown in FIGS. 2 and 3. In such a case, the transparent sheet 65 member with register marks or the L-shaped member 67 with the register marks is placed on the platen in advance of the feed of the photosensitive material 1 onto the platen.

In the methods explained in connection with FIG. 7 and FIGS. 9 to 11, register marks are formed simultaneously with the exposure to the original image. This, however, is not exclusive and the register mark can be fomred by, for example, a flash exposure after the exposure to the original image.

As has been described, it is possible to form the register marks on the predetermined portions of the photosensitive material simultaneously with the exposure to the original image by using, in the photographing section of the process camera apparatus, a platen having register marks provided thereon by making use of one side thereof as a reference, or a tansparent sheet having register marks. This arrangement offers the following advantages:

(a) The register marks are formed precisely in a predetermined positional relationship to the image on each photosensitive material, unless the position of the original is changed. When the magnification is changed, the above-mentioned positional relationship is maintained constant for each magnification, so that a plurality of separated color plates for color printing can be formed with a constant positional relationship between the register marks and the image. This in turn permits the images on different color plates to be precisely superposed by virture of the register marks.

In case of a multi-color printing by means of a direct plate, the direct plate formed by the process camera apparatus is cut along a line which is determined by making use of the register marks as a reference. Then, the register holes are formed by punching by making use of the cut line of the direct plate or the register marks on the direct plate, and the direct plate is mounted on the plate cylinder by means of these register holes. According to this method, therefore, it is possible to prevent offsetting of colors without requiring any adjustment on the press.

(b) The thickness of the line of the register marks is maintained constant even when the photographing magnification is increased, so that the fineness of the registered mark required for the registering can be maintained thereby ensuring a high precision of the registering.

(c) In the monocolor printing, although the registering for preventing the offsetting of coor is unnecessary, it is essential that the plate be mounted on the plate cylinder at least in such a manner as to avoid any rotation of the image from the correct position on the plate cylinder. According to the described method register marks are formed on the plate simultaneously with the image exposure. Then, register punch holes are formed in the plate by making use of these register marks as the reference. Alternatively, the plate is cut along a line determined by making use of the register marks as the reference and register holes are formed by punching along the cut lines. Using these register holes, it is possible to quickly and correctly mount the plate on the plate cylinder.

(d) The described methods for forming the register marks can be carried out with a simple arrangement and, therefore, can be applied easily to conventional direct plate cameras. Using these methods, the smallscale printing systems which heretofore have been used mainly for monocolor printing can be easily adapted to multi-color printing.

What is claimed is:

1. A process camera apparatus comprising:
    a base;
    a transparent platen provided on said base;
    a light-shielding means covering the upper side of said transparent platen such as to form a light-shielded region on said transparent platen;
    a screen means including a contact screen and a supporting means for supporting said contact screen, said screen means being withdrawably disposed on the portion of said transparent platen within said light-shielded region;
    a conveyor means disposed adjacent one end of said base and adapted for conveying said photosensitive material into said light-shielded region; and
    a light-shielded condition maintaining means adapted to maintain the light-shielded condition in said light-shielded region when said screen means is being taken out from said light-shielded region,
    said light-shielding means including a light-shielding frame having a light-shielding cover sheet, said light-shielding frame being pivotable between an open position and a closing position in which said light-shielding frame covers the upper side of said platen such as to form said light-shielded region on said platen.

2. A process camera apparatus according to claim 1, wherein said light-shielding frame includes a frame member having a substantially rectangular planar shape, one side of said rectangular form of said frame member being movable up and down with respect to said base when said frame is in the closing position, said light-shielding cover sheet being fixed to said frame member such as to cover the substantially rectangular area surrounded by said frame member.

3. A process camera apparatus according to claim 1, wherein said light-shielded condition maintaining means includes a pair of rollers, one of said rollers being fixed on a side of said base different from said one side of said base, while the other roller is disposed on a corresponding portion of said light-shielding frame, said rollers being adapted to cooperate with each other in clamping therebetween said contact screen when said screen means is being taken out of said light-shielded region.

4. A process camera apparatus comprising:
    a base;
    a transparent platen provided on said base;
    a light-shielding means covering the upper side of said transparent platen such as to form a light-shielded region on said tranparent platen;
    a conveyor means disposed adjacent one end of said base and adapted for conveying said photosensitive material into said light-shielded region; and
    a guide plate extending obliquely upwardly from a position near the outlet of said conveyor means to a position above said base and said transparent platen, such as to guide said photosensitive material when the latter is being fed onto said transparent platen,
    said guide plate being displaceable such that the underside of said guide plate projected into said light-shielded region approaches said base and said transparent platen, the displacement of said guide plate being caused after the feed of said photosensitive material.

5. A process camera apparatus according to claim 4. wherein said guide plate is secured through a spring-urged hinge for a vertical pivotal movement, said displacement of said guide plate being a pivotal motion of said guide plate against the urging force of said spring.

6. A process camera apparatus according to claim 4, wherein said guide plate is includes a resilient sheet material, while the displacement of said guide plate is allowed by resilient deformation of said guide plate.

7. A process camera apparatus according to claim 4, wherein said guide plate is constituted by a transparent material and is provided with register marks formed thereon.

8. A process camera apparatus comprising:
    a base;
    a transparent platen provided on said base;
    a light-shielding means covering the upper side of said transparent platen such as to form a light-shielded region on said transparent platen;
    a screen means including a contact screen and a supporting means for supporting said contact screen, said screen means being withdrawably disposed on the portion of said transparent platen within said light-shielded region;
    a conveyor means disposed adjacent one end of said base and adapted for conveying said photosensitive material into said light-shielded region; and
    a light-shielded condition maintaining means adapted to maintain the light-shielded condition in said light-shielded region when said screen means is being taken out from said light-shielded region,
    said light-shielding means including a light-shielding frame having a light-shielding cover sheet, said light-shielding frame being pivotable between an open position and a closing position in which said light-shielding frame covers the upper side of said platen such as to form said light-shielded region on said platen,
    said conveyor means including a pair of rollers for clamping and conveying said photosensitive material, said pair of rollers being adapted to clamp and fix the trailing end of said photosensitive material fed onto said transparent platen, thereby preventing deviation of position of said photosensitive material.

9. a process camera apparatus comprising:
    a base;
    a transparent platen provided on said base;
    a light-shielding means covering the upper side of said transparent platen such as to form a light-shielded region on said transparent platen;
    a screen means including a contact screen and a supporting means for supporting said contact screen, said screen means being withdrawably disposed on the portion of said transparent platen within said light-shielded region;
    a conveyor means disposed adjacent one end of said base and adapted for conveying said photosensitive material into said light-shielded region; and
    a light-shielded condition maintaining means adapted to maintain the light-shielded condition in said light-shielded region when said screen means is being taken out from said light-shielded region,
    said light-shielding means including a light-shielding frame having a light-shielding cover sheet, said light-shielding frame being pivotable between an open position and a closing position in which said light-shielding frame covers the upper side of said platen such as to form said light-shielded region on said platen, said conveyor means including a pair of rollers for clamping and conveying said photosensitive material, the direction of rotation of said rollers being switchable between a first direction in which said rollers feed said photosensitive material onto said transparent platen and a second direction in which said rollers discharge said photosensitive material on said transparent platen to a processing means having a developing solution, said pair of rollers being adapted to clamp and fix the trailing end of said photosensitive material fed onto said transparent platen, thereby preventing deviation of position of said photosensitive material.

10. A process camera apparatus comprising:
a base;
a transparent platen provided on said base;
a light-shielding means covering the upper side of said transparent platen such as to form a light-shielded region on said transparent platen;
a conveyor means disposed adjacent one end of said base and adapted for conveying said photosensitive material into said light-shielded region; and
a guide plate extending obliquely upwardly from a position near the outlet of said conveyor means to a position above said base and said transparent platne, such as to guide said photosensitive material when the latter is being fed onto said transparent platen, said guide plate being displaceable such that the underside of said guide plate projected into said light-shielded region approaches said base and said transparent platen, the displacement of said guide plate being caused after the feed of said photosensitive material, said guide plate being made of an electrically conductive material.

* * * * *